United States Patent
Shinjo et al.

(10) Patent No.: US 6,932,946 B2
(45) Date of Patent: Aug. 23, 2005

(54) OZONE GENERATOR

(75) Inventors: Ryoichi Shinjo, Kanagawa (JP); Minoru Harada, Kanagawa (JP); Yukiko Nishioka, Kanagawa (JP)

(73) Assignee: Ebara Corporation, Tokyo (JP)

( * ) Notice: Subject to any disclaimer, the term of this patent is extended or adjusted under 35 U.S.C. 154(b) by 516 days.

(21) Appl. No.: 09/885,102

(22) Filed: Jun. 21, 2001

(65) Prior Publication Data

US 2002/0001550 A1 Jan. 3, 2002

(30) Foreign Application Priority Data

Jun. 29, 2000 (JP) .......................................... 2000-195421

(51) Int. Cl.⁷ .............................................. B01J 19/08
(52) U.S. Cl. ............................ 422/186.14; 422/186.19; 422/422; 422/186.2
(58) Field of Search ....................... 422/186.07, 186.14, 422/186.18, 186.19, 186.2, 186.11; 210/748

(56) References Cited

U.S. PATENT DOCUMENTS

| | | | |
|---|---|---|---|
| 5,549,874 A | | 8/1996 | Kamiya et al. |
| 5,759,497 A | | 6/1998 | Kuzumoto et al. |
| 6,049,086 A | * | 4/2000 | Foggiato et al. ........ 250/504 R |

FOREIGN PATENT DOCUMENTS

| | | |
|---|---|---|
| EP | 0 579 060 | 1/1994 |
| JP | 63/137748 | 6/1988 |
| JP | 06-126157 | 5/1994 |
| JP | 2540627 | 4/1997 |
| WO | 96/06800 | 3/1996 |

OTHER PUBLICATIONS

Patent Abstracts of Japan, vol. 1999, No. 9, Jul. 30, 1999, entitled "Electric Discharge Type Ozonizer" by Hiroichi Shioda.
Patent Abstracts of Japan, vol. 1997, No. 3, Mar. 31, 1997, entitled "Ozone Generating Electrode Device and Production of Ozone Generating Electrode", by Akihiro Uchida.
Patent Abstracts of Japan, vol. 1996, No. .4, Apr. 30, 1996, entitled "Ozonizer", by Hiroichi Shioda.
Database WPI, Section Ch, Week 199425, Derwent Publications Ltd., London, GB, AN 1988–201205, XP–002180790.

* cited by examiner

*Primary Examiner*—Thao T. Tran
(74) *Attorney, Agent, or Firm*—Wenderoth, Lind & Ponack L.L.P.

(57) ABSTRACT

An ozone generator comprises a pair of spaced opposing electrodes, electrically conductive members connecting the pair of electrodes to a high-voltage alternating-current power source to generate an electric discharge between the electrodes, and a dielectric provided between the opposing electrodes. A gas flow passage for allowing flow of a material gas therethrough is defined by the surfaces of the electrodes. At least one of the surfaces of the pair of electrodes has a plurality of parallel grooves. The material gas flows in a space between the plurality of grooves and the dielectric, in a direction transverse to the grooves.

11 Claims, 7 Drawing Sheets

OZONE GENERATOR

BACKGROUND OF THE INVENTION

The present invention relates to an electric discharge type ozone generator and an electric discharge cell there of for generating ozone ($O_3$) which is used for water sterilization, oxidation bleaching requiring a high degree of oxidation, semiconductor manufacturing processes, and so on.

Conventional electric discharge cells for a discharge type ozone generator are shown in FIGS. 9 to 11. Each of the electric discharge cells of FIGS. 9 to 11 comprises a high-voltage electrode 13, a low-voltage earth electrode 14, and a dielectric 15 and a space 16 for discharge provided between the electrodes 13 and 14. The high-voltage electrode 13 is connected to the high-voltage side of an alternating-current high-voltage power source 17. The earth and the earth electrode 14 are connected to the low-voltage side of the alternating-current high-voltage power source 17.

FIG. 9 is a general side view of the electric discharge cell. FIG. 10 is an enlarged cross-sectional view, taken along the line E—E in FIG. 9. In the electric discharge cell of FIGS. 9 and 10, the high-voltage electrode 13 is provided along an inner circumferential surface of the dielectric 15 (which consists of a glass tube), and the earth electrode 14 in a cylindrical form is arranged so as to face an outer circumferential surface of the glass tube. The dielectric 15 is disposed between the high-voltage electrode 13 and the earth electrode 14. A material gas containing oxygen flows through the space 16 for discharge, and a part of the oxygen is converted to ozone.

FIG. 11 is a general cross-sectional view of an essential part of a gaseous discharge reaction apparatus disclosed in JP-B2-6-51113 (Examined Japanese Patent Publication, Kokoku). The high-voltage electrode 13, which is connected to the high-voltage side of the alternating current high-voltage power source 17, is arranged to face the earth electrode 14 which is covered by the dielectric 15. An electrode surface of the high-voltage electrode 13 facing the earth electrode 14 includes a number of grooves extending parallel to each other. As shown in FIG. 11, each of the grooves is a so-called "trench groove," which is formed by two planes intersecting at a substantially right angle. The grooves as viewed in section along a longitudinal direction are saw-toothed. In the apparatus of FIG. 11, the material gas flows in a direction parallel to the trench grooves or in a longitudinal direction of the grooves, that is, in a direction perpendicular to the paper of FIG. 12.

FIG. 12 is an enlarged view of a trench groove 16, showing a field of discharge in the apparatus of JP-B2-6-5113. A field Q of discharge indicated by grid-like hatching, which is called a creeping discharge field, is generated in a region in the vicinity of an indentation 11 of the groove. The remaining region in the groove is occupied by a field P of discharge indicated by diagonal hatching, which is called a silent discharge field. The material gas passes through the fields P and Q of discharge at a high density, to thereby conduct an efficient discharge reaction.

A uniform discharging gap, such as that shown in FIGS. 9 and 10, is suitable for effecting flow of the material gas in a large volume and generating a large amount of ozone. However, such a uniform discharging gap is not suitable for generating a gas containing a high concentration of ozone. On the other hand, in a discharging gap formed by a trench groove such as that shown in FIGS. 11 and 12, a gas containing a high concentration of ozone can be generated as compared to the above-mentioned uniform discharging gap. However, when a flow rate of the material gas is reduced to further increase the concentration of ozone, the material gas tends to flow into a region close to the indentation 11 of the trench groove, which imparts only a small resistance to the flowing material gas. Thus, it is difficult to make the material gas flow at a ridge portion 12 of the trench groove, where a high density of discharge can be obtained and a gas containing a high concentration of ozone can be easily generated. Therefore, in the discharging gap formed by the trench groove, a concentration of ozone as high as about 10 vol % can be obtained, but it is difficult to achieve any higher concentrations.

JP-B2-2983153 (Japanese Patent Publication) discloses various structures of high-concentration ozone generators. In the ozone generator of this patent, the gas pressure in the space for discharge is set to 1 atm or more, and the length of a discharging gap in the space for discharge is set to 0.4 mm or less. Further, a plurality of members for maintaining a predetermined distance between the electrodes are distributed separately over the entire electrode surface, and a stress buffering plate is arranged between two ozone generators arranged in a stacked configuration for maintaining the predetermined length of the discharging gap in the space for discharge.

JP-A-9-504772 (Japanese National Publication of PCT, Kohyo) discloses a lightweight and compact ozone generating cell for generating a gas containing a high concentration of ozone. The cell of this publication comprises a high-voltage assembly comprising a high-voltage electrode, a low-voltage assembly comprising a low-voltage electrode, a barrier dielectric means for defining a discharging region for generating an ozone-containing gas between the electrodes, and a weld seal portion for connecting the assemblies. A permanently sealed chamber is formed between the assemblies to include the discharging region.

In recent years, the range of applications of ozone ($O_3$) which is used as a cleaning agent for oxidation sterilization has been expanding. However, as mentioned above, the concentration of ozone generated by ozone generators is generally low, which has inhibited the use of the gas in industry. Various methods for increasing the concentration of ozone produced during its manufacture have been proposed, such as the use of liquidation and adsorption, and some of them have been put into practice. However, apparatuses used in these methods are complicated and expensive, which highly limits their use.

SUMMARY OF THE INVENTION

In view of the above, the present invention has been made. An object of the present invention is to propose an electric discharge cell for a novel ozone generator, and to provide an ozone generator which enables a gas containing an extremely high concentration of ozone to be generated without the use of a complicated apparatus.

Another object of the present invention is to provide an electric discharge cell for an ozone generator capable of generating a gas containing a high concentration of ozone efficiently, which ozone is of high purity required for forming a silicon oxide ($SiO_2$) insulating layer on the surface of a silicon (Si) plate for manufacturing a semiconductor substrate.

A further object of the present invention is to reduce the size of an ozone generator. A still further object of the present invention is to enable cooling of the electric discharge cell of the ozone generator by using an electrically conductive liquid such as service water, and not using deionized water, and to conduct cooling of the ozone generator both efficiently and at low cost. A still further object of the present invention is to arrange the electric discharge cell in a stackable form, and provide an ozone generator which is both compact and has a large capacity.

The present invention provides an electric discharge cell for an ozone generator, comprising: a pair of electrodes having opposing electrode surfaces; electrically conductive members adapted to connect the pair of electrodes to a high-voltage alternating-current power source for applying a high voltage between the pair of electrodes and generating an electric discharge between the electrode surfaces; a dielectric provided between the opposing electrode surfaces; and a gas flow passage for effecting flow of a material gas between the opposing electrode surfaces. At least one of the opposing electrode surfaces of the pair of electrodes includes a plurality of trench grooves extending substantially parallel to each other, and the material gas flows through a space between the trench grooves and the dielectric in a direction transverse to the trench grooves.

The present invention also provides an electric discharge cell for an ozone generator, comprising: a pair of electrodes provided in spaced opposing relation, with each of the electrode surfaces having a generally circular form; electrically conductive members adapted to connect the pair of electrodes to a high-voltage alternating current power source; and a gas flow passage for effecting flow of a material gas between the opposing electrode surfaces. One of the electrode surfaces is covered by a flat dielectric plate, and the other electrode surface includes concentric or generally concentric circular trench grooves. The material gas flows in a direction transverse to the trench grooves.

The arrangement of the ozone generator or the electric discharge cell of the present invention may be such as mentioned below.

(1) One electrode has a flat electrode surface.

(2) The dielectric between the electrodes is disposed so as to cover the flat electrode surface of the other electrode.

(3) Each of the electrode surfaces have a circular form.

(4) A disk-shaped space is formed between the circular electrode surface and the dielectric plate.

(5) An outer peripheral space is formed along an outer circumferential portion of the circular electrode surface so as to communicate with the disk-shaped space.

(6) A central space which communicates with the disk-shaped space is provided at a central portion of the circular electrode surface.

(7) A radial gas flow passage extends from the central space outwardly of the electrodes parallel with the disk-shaped space.

(8) The material gas flows radially from the central space to the outer peripheral space in the disk-shaped 5 space.

(9) The material gas flows radially inward in the disk-shaped space from the outer peripheral space.

(10) The material gas flows radially outward from the central space to the outer peripheral space through the disk-shaped space.

(11) The low-voltage earth electrode includes a cooling medium flow passage.

(12) The holding plate for the high-voltage electrode includes a cooling medium flow passage and an insulating plate is provided between the holding plate and a jacket.

(13) A plurality of electric discharge cells, each comprising a pair of electrodes, are arranged in a stacked configuration.

(14) Each electrode of the electric discharge cell is made of high-purity aluminum.

(15) The electrode surface is covered with aluminum oxide.

(16) The trench grooves of the electrode surface as viewed in section perpendicular to the longitudinal direction of the grooves are corrugated or saw-toothed.

(17) One electrode surface is covered with a single crystal of sapphire (high-purity A1203).

(18) One electrode surface is covered with ceramic.

(19) The material gas is a high-purity oxygen gas.

(20) The material gas is one which has been obtained by adding 0.8 vol % of high-purity nitrogen to a high-purity oxygen gas.

(21) The material gas flows from an outer circumferential portion to a central portion of the electrode surfaces in a radially inward direction.

(22) One electrode is supported by a holding plate through an insulating plate.

(23) A cooling medium flow passage is formed in each of the holding plate and the other electrode.

(24) An electrically conductive cooling medium flows through the respective cooling medium flow passages of the holding plate and the other electrode.

(25) The cooling medium flow passage of the holding plate communicates with a cooling medium inlet and a cooling medium outlet provided at an outer circumferential surface of the holding plate and the cooling medium flow passage of the other electrode communicates with a cooling medium inlet and a cooling medium outlet provided at an outer circumferential surface of the other electrode.

(26) The cooling medium outlet of the holding plate communicates with the cooling medium inlet of the other electrode.

(27) The cooling medium is water.

(28) The temperature of the cooling water is 20° C.

In the electric discharge cell of the ozone generator of the present invention, a pair of electrodes having opposing electrode surfaces are connected to a high-voltage alternating-current power source so that an electric discharge is generated between the electrode surfaces by application of a high-voltage, and a material gas flows between the opposing electrode surfaces, a part of the oxygen contained in the material gas is converted to $O_3$. Since a dielectric is disposed between the opposing electrode surfaces, there is no damage to the electrode surfaces. Although a large amount of heat is generated by the pair of electrodes due to the electric discharge, the electrodes are cooled by a cooling medium passing through the cooling medium flow passages. The cooling medium flow passage for cooling a high-voltage electrode is insulated from the high-voltage electrode by the insulating plate, so that undesirable passage of an electric current through the cooling medium between the high-voltage power source and the low-voltage power source does not occur. The oxygen in the material gas appropriately flows in the vicinity of the ridge portions of the trench grooves. Therefore, a gas containing a high concentration of ozone is generated by the action of a strong electric field. Further, by passing the material gas through a plurality of discharging gaps in an electric discharge cell comprising a plurality of pairs of disk-shaped electrodes arranged in a stacked configuration, the concentration of ozone can be easily increased.

The foregoing and other objects, features and advantages of the present invention will be apparent from the following detailed description and appended claims taken in connection with the accompanying drawings.

DETAILED DESCRIPTION OF THE INVENTION

Figure 1:
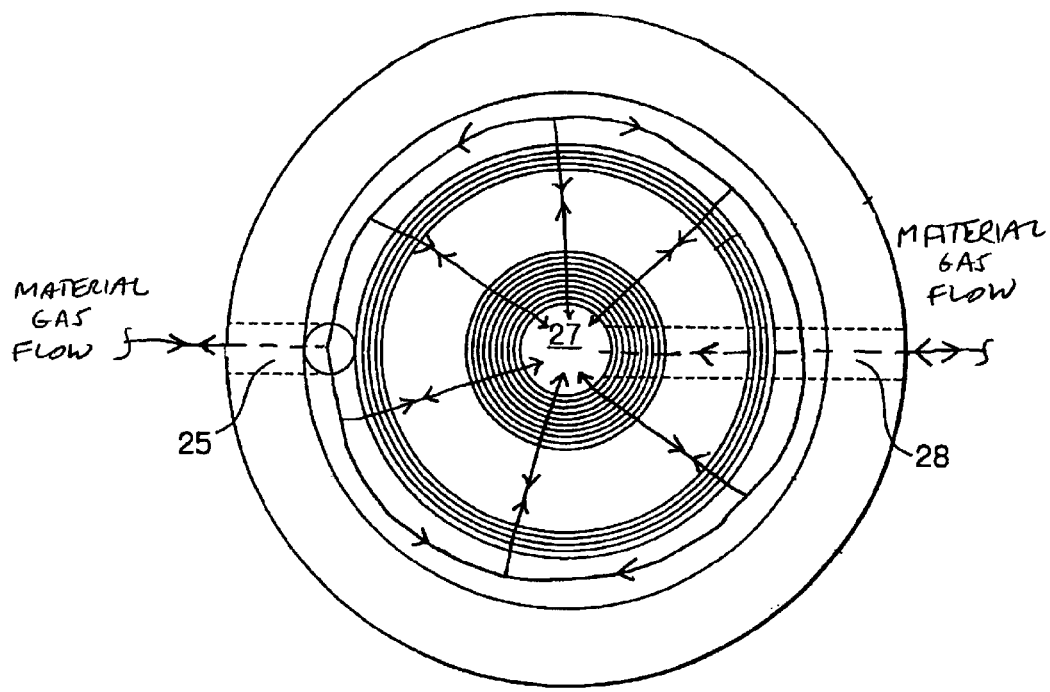
FIG. 1 is a plan view showing a circular electrode surface of an electric discharge cell according to an embodiment of the present invention, which is taken along the line A—A in FIG. 2.
Figure 2:
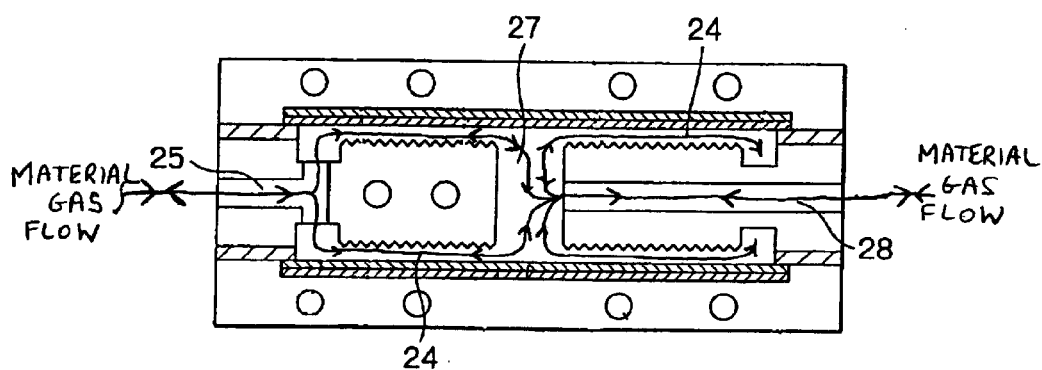
FIG. 2 is a side cross-sectional view showing the electric discharge cell in the embodiment of the present invention, which is taken along the line B—B in FIG. 1.
Figure 3:
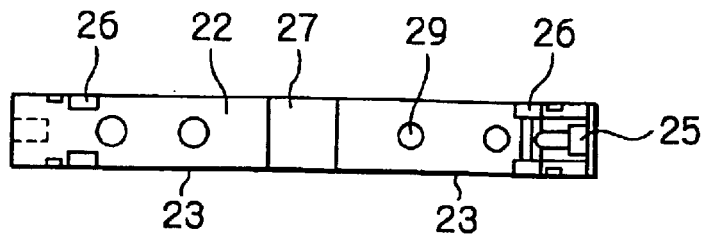
FIG. 3 is a side cross-sectional view of an electrode having opposite circular electrode surfaces each including concentric grooves.
Figure 4:
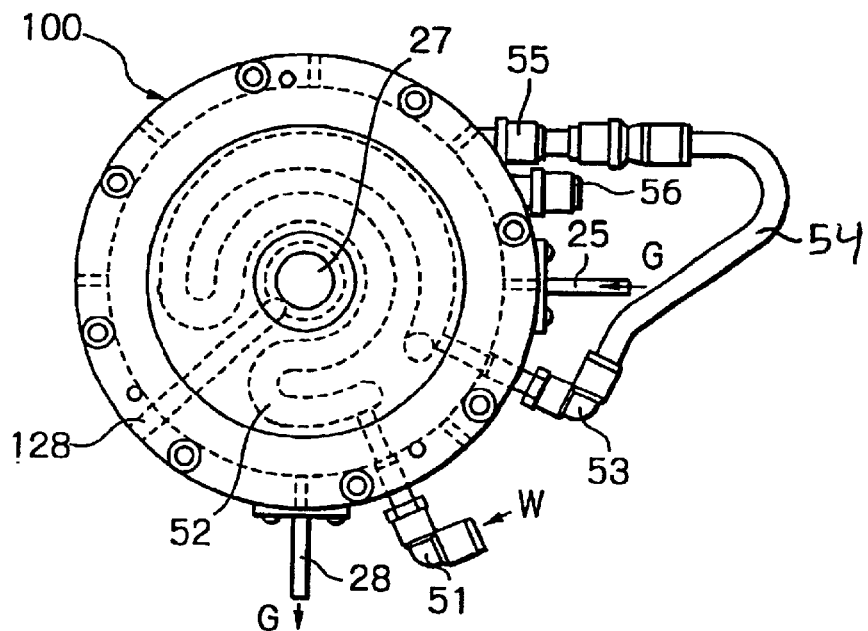
FIG. 4 is a plan view of an ozone generator having the electrode of FIG. 3 incorporated therein.
Figure 5:
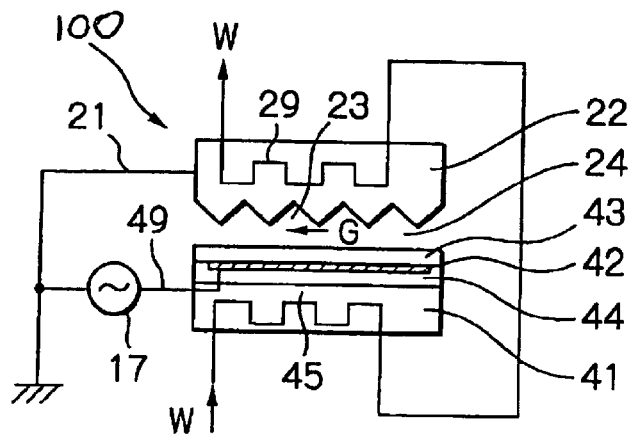
FIG. 5 is a schematic illustration showing a main arrangement of an electric discharge cell for an ozone generator of the present invention.

Referring to the accompanying drawings, preferred embodiments of the present invention are described below. In FIGS. 1 to 7, the same portions or members are designated by the same reference numerals and characters, and any overlapping explanation is omitted. FIG. 1 is a plan view showing a circular electrode surface of an electric discharge cell according to an embodiment of the present invention, which is taken along the line A—A in FIG. 2. FIG. 2 is a side cross-sectional view showing the electric discharge cell in this embodiment of the present invention, which is taken along the line B—B in FIG. 1. FIG. 3 is a side cross-sectional view of a disk-shaped low-voltage electrode used in an embodiment of the present invention. FIG. 4 is a plan view of an ozone generator having the electrode of FIG. 3 incorporated therein. FIG. 5 is a schematic illustration showing a main arrangement of an ozone generator of the present invention.

Figure 12:
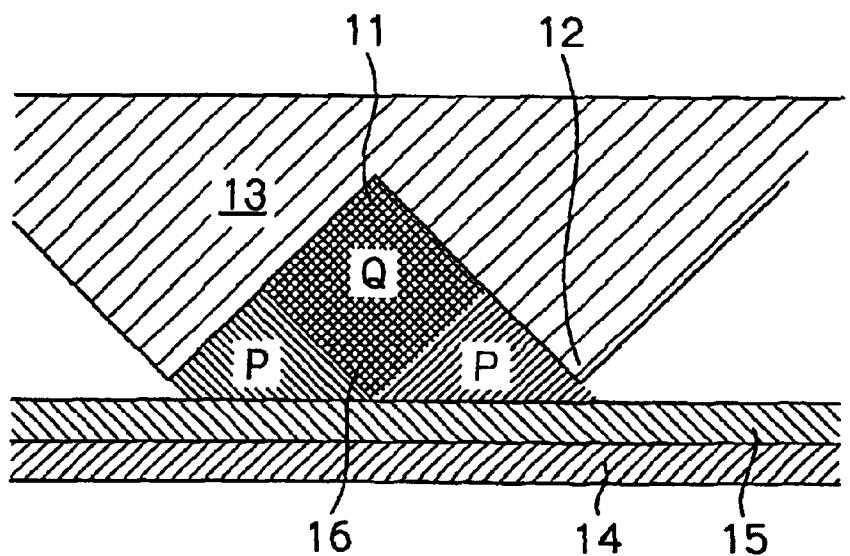
FIG. 12 is an enlarged cross-sectional view of the 5 grooves shown in FIG. 11.

An ozone generator electric discharge cell 100 shown in FIG. 2 includes low-voltage electrode 22 and a high-voltage electrode 42 each having a circular electrode surface. A dielectric 43 and a disk-shaped space (i.e., gas flow space) 24 are provided between the opposing circular electrode surfaces of the respective electrodes. The disk-shaped space 24 is adapted to have a moderate discharge generated therein between the opposing circular electrode surfaces. When a material gas containing oxygen flows through the disk-shaped space 24, the oxygen is converted to ozone. The high-voltage electrode 42 is connected to the high-voltage side of a high-voltage alternating-current power source 17 (FIG. 5), while the low-voltage electrode 22 is connected to the low-voltage side (ground) of the alternating-current power source 17. As shown in FIGS. 1 and 2, the electrode surface of the low-voltage electrode 22 includes a number of trench grooves 23 extending parallel to each other (i.e., concentric grooves 23). The trench grooves can be arranged in the form of a known structure such as that shown in FIG. 12.

The high-voltage electrode 42 is formed from a metal layer provided between an insulating plate 44 and the dielectric 43 supported by a holding plate 41. The dielectric 43 is a disk-like member made of a single crystal of sapphire and the high-voltage electrode 42 is made of a silver-type metallizing layer deposited on a back surface of the sapphire. The space between the ridge portions 12 (FIG. 12) of the trench groove 23 and the surface of the dielectric 43 defines the disk-shaped space 24. The distance between the ridge portion of the groove 23 and the surface of the dielectric 43 is set to 0.01 mm to 0.3 mm. When a clean ozone gas (such as that used for manufacturing semiconductors) is required to be used, sapphire which is a clean material can be suitably used as the material of the dielectric 43. When a high-purity material is not required to be used for the dielectric 43, the dielectric 43 can be formed from a ceramic material such as alumina ceramic.

A material gas G is introduced into the disk-shaped space 24 through a gas flow passage including an inlet passage 25 having an inlet port and including an outer peripheral space 26, (i.e., annular passage) 26 and flows through the disk-shaped space 24 in a generally radially inward direction. The material gas G is then collected in a central passage 27 at a central portion of the low-voltage electrode 22, and is guided through a guide passage 28 of the gas flow passage in a radially outward direction with respect to the electrode and to an outlet port. The material gas G may also flow through the disk-shaped space 24 in a generally radially outward direction, instead of a generally radially inward direction (i.e., the inlet port and the outlet port are reversed). In that case, the material gas G is first introduced into the central space 27 through the guide passage 28, flows through the disk-shaped space 24 in the generally radially outward direction and is guided into the inlet passage 25 through the outer peripheral space 26.

As mentioned above, the high-voltage electrode 42 is connected to the high-voltage side of the high-frequency high-voltage alternating-current power source and the low-voltage electrode 22 is connected to the low-voltage side of the same power source. A high-voltage alternating current voltage is applied to the disk-shaped space 24 between the electrodes, and a moderate discharge is generated in the disk-shaped space 24. In this state, the material gas G containing oxygen flows through the disk-shaped space 24 and a part of the oxygen is converted to ozone. In the electric discharge cell shown in FIGS. 1 and 2, the material gas G flows in a direction transverse to the grooves 23, and thereby appropriately passes the ridge portions of the grooves at which a high discharge density is obtained. As a result, it is possible to generate high concentrated ozone.

FIG. 3 is a cross-sectional view of a disk-shaped electrode having opposite circular electrode surfaces, in which each surface includes concentric grooves, according to an embodiment of the present invention. FIG. 4 is a plan view of an ozone generator having the disk-shaped electrode of FIG. 3 incorporated therein. In the embodiment shown in FIGS. 3 and 4, the material gas G is introduced into the disk-shaped space 24 of the electric discharge cell 100 through the inlet passage 25, flows through the disk-shaped space 24 in the generally radially inward direction, collects in the central space 27 at the central portion of the low-voltage electrode 22, and is guided through the guide passage 28 in the radially outward direction with respect to the electric discharge cell 100, as in the case of the embodiment of FIGS. 1 and 2. Cooling water W flows from a cooling medium inlet 51 through a cooling medium passage formed in a high-voltage electrode supporting member to a cooling medium outlet 53. Then, the cooling water flows through a conduit 54 and a cooling medium inlet 55 to a cooling medium passage 29 formed in the low-voltage electrode, and is discharged through a cooling medium outlet 56.

In the embodiment of FIGS. 3 and 4, the low-voltage electrode 22 comprises a disk-shaped electrode having opposite electrode surfaces including concentric grooves, and each of the inlet for gas (the inlet passage 25), the outlet for gas (the guide passage 28), the cooling medium inlets 51 and 55, the cooling medium outlets 53 and 56 and a passage 128 for a high-voltage cable is provided at an outer peripheral portion of the electric discharge cell.

The grooves are made concentrically, and the material gas G is introduced from the outer periphery to the inner portion radially with respect to the disk-shaped electrode. Thus, the material gas G flows in the space between the grooves and the dielectric transversely with respect to the grooves.

By this arrangement, a plurality of electric discharge cells such as that shown in FIGS. 3 and 4 can be arranged in a stacked cylindrical configuration, thus facilitating generation of a gas containing a high concentration of ozone while enabling a reduction in size of the ozone generator.

FIG. 5 is a schematic illustration of a main arrangement of the electric discharge cell of the ozone generator of the present invention. In FIG. 5, the electric discharge cell 100 of the ozone generator comprises a pair of electrodes having opposing electrode surfaces, namely, the low-voltage electrode 22 and the high-voltage electrode 42. Electrically conductive wires 21 and 49 are arranged for connecting the electrodes 22 and 42 to the high-voltage power source 17 so as to generate a discharge between the opposing electrode surfaces by application of a high-voltage between the electrodes. The dielectric 43 is provided between the opposing electrode surfaces and the disk-shaped space 24 for passage of the material gas G therethrough between the opposing electrode surfaces. The electrode surface of the low-voltage electrode 22 includes the trench grooves 23 extending parallel to each other. The high-voltage electrode 42 is formed from a metal layer provided between the insulating plate 44 and the dielectric 43 supported by the holding plate 41. The material gas G flows through the space between the trench grooves 23 and the dielectric 43 in a direction transverse to the grooves.

In an ozone-generating electric discharge cell, an efficient cooling operation is necessary for generating a gas containing a high concentration of ozone. In the electric discharge cell of FIG. 5, a cooling medium passage 45 and the cooling medium passage 29 are formed in the holding plate 41 for the high-voltage electrode 42 and the low-voltage electrode 22 for passage of the cooling medium, respectively. Although the ozone generator can be simplified by using the same cooling liquid for cooling the two electrodes, when an electrically conductive cooling medium, such as service water, is used for cooling the electrodes, an electric current passes through the medium. As a countermeasure, in the electric discharge cell in FIG. 5, the insulating plate 44 is provided between the high-voltage electrode 42 and the cooling medium passage 45 so as to block the passage of an electric current from the high-voltage electrode 42 to the cooling medium. Therefore, even when an electrically conductive cooling medium such as service water is used, undesirable passage of an electric current through the cooling medium between the electrodes does not occur.

Figure 6:
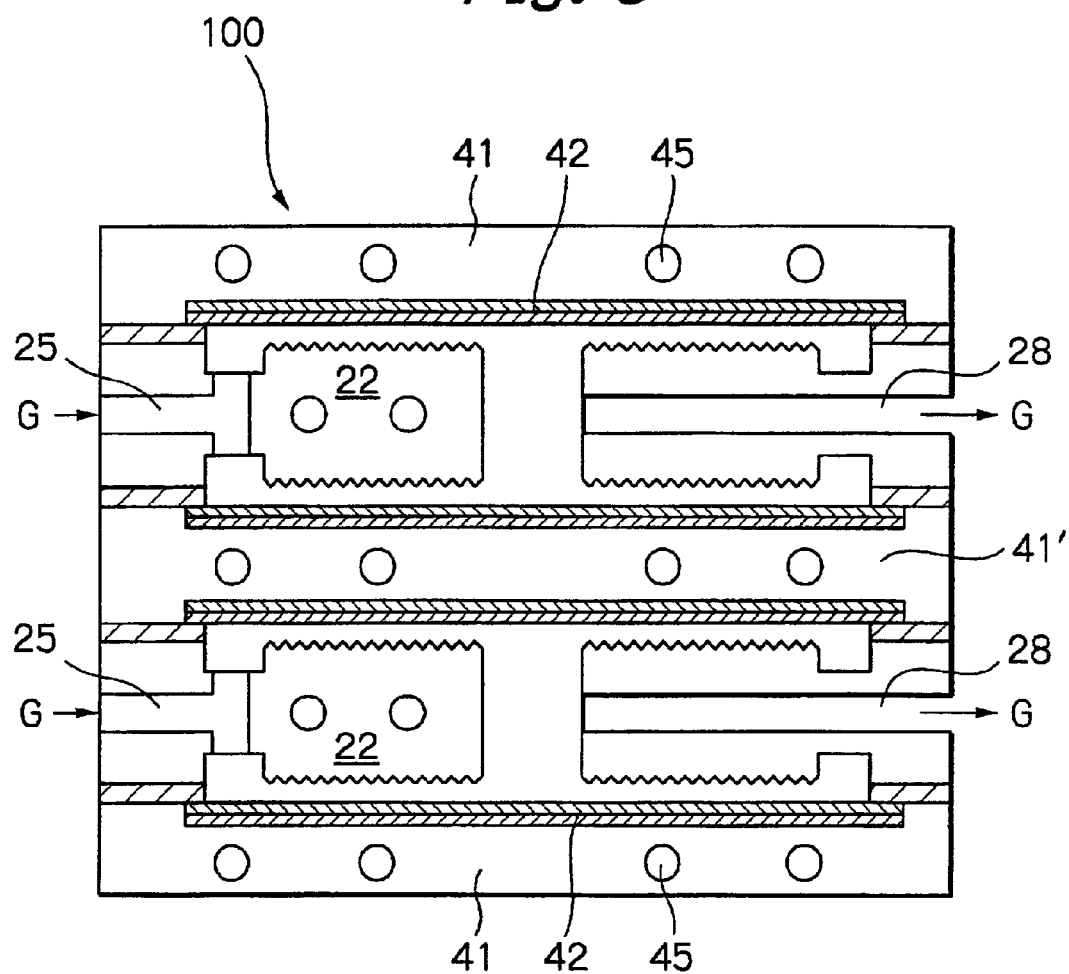
FIG. 6 is a general side cross-sectional view of an electric discharge cell assembly for an ozone generator of the present invention, which comprises the electric discharge cells arranged in a stacked configuration.
Figure 7:
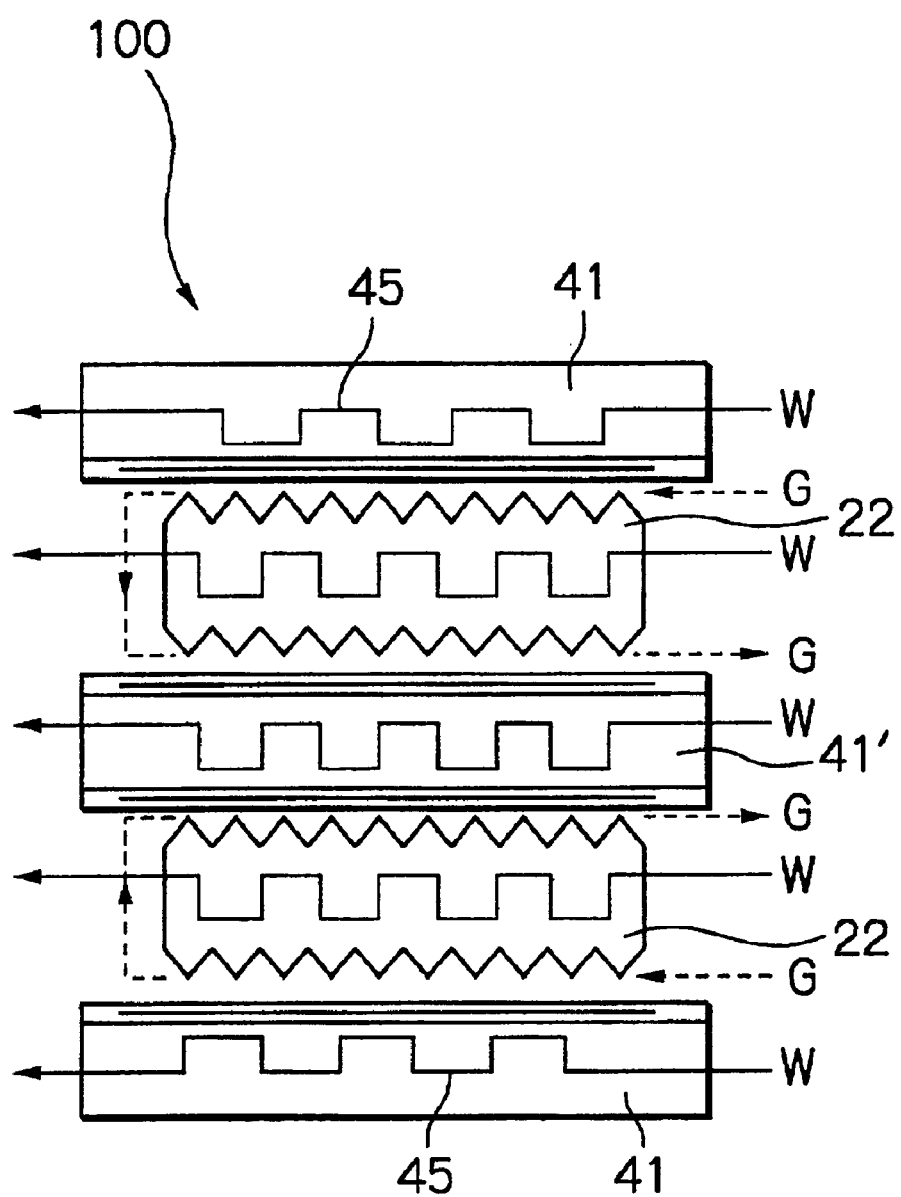
FIG. 7 is a schematic illustration showing the electric discharge cell assembly in the present invention.

FIG. 6 is a general side cross-sectional view of an electric discharge cell assembly 100 for an ozone generator of the present invention, which comprises the electric discharge cells arranged in a stacked configuration. FIG. 7 is a schematic illustration showing the electric discharge cell assembly 100 of the present invention. In the electric discharge cell assembly 100 of FIGS. 6 and 7, the same members as those shown in FIGS. 1 to 5 are designated by the same reference numerals and characters as those used in FIGS. 1 to 5, and any overlapping explanation is omitted. In the ozone generator comprising the electric discharge cell assembly 100 of FIGS. 6 and 7, the concentration of ozone can be increased by passing the material gas G through the plurality of discharging gaps between the electrodes. In particular, by stacking the disk-shaped electrodes, the ozone generator can be reduced in size and minimized in volume.

Figure 8:
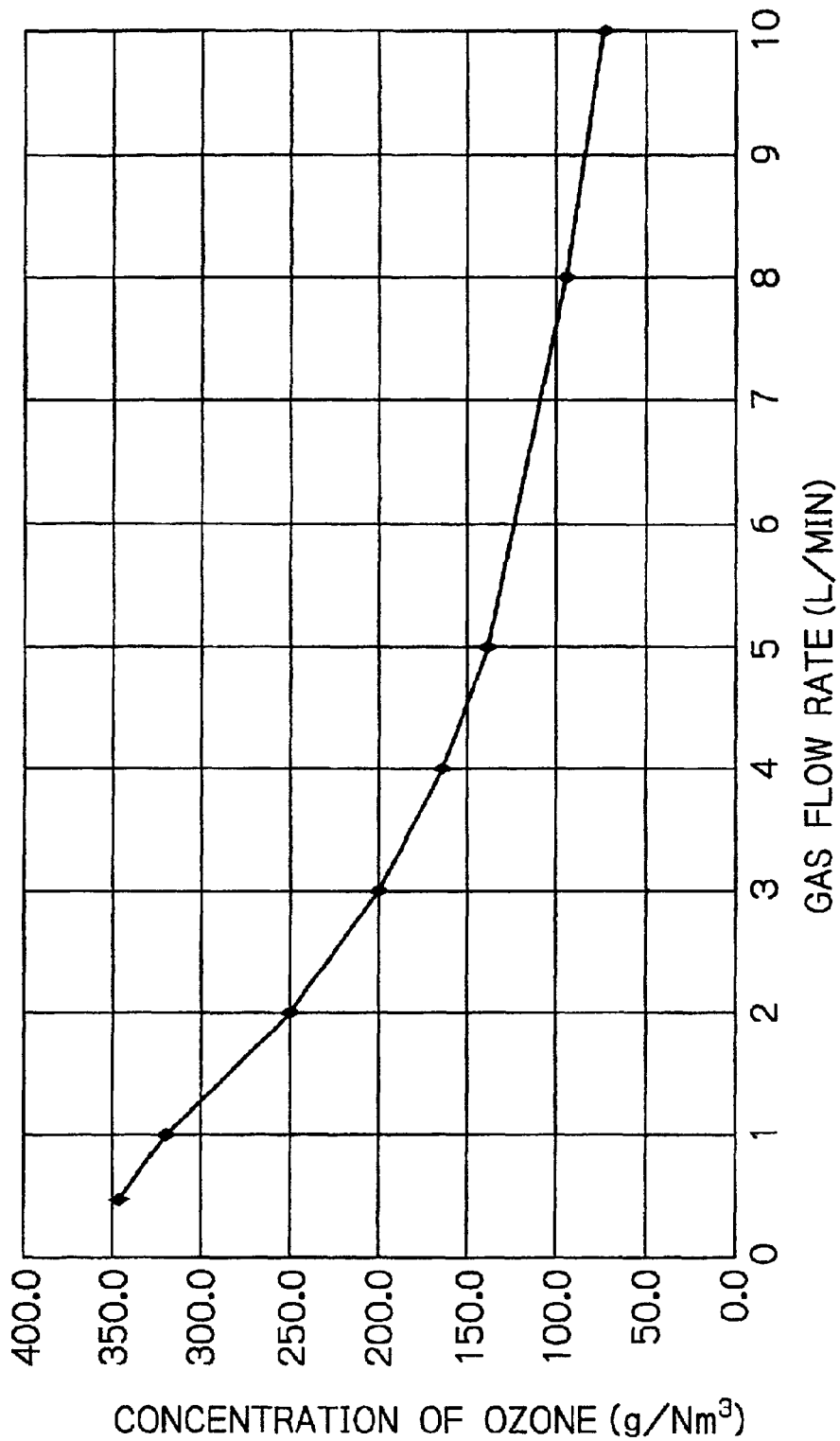
FIG. 8 is a graph illustrating the performance of the ozone generator of the present invention.
Figure 9:
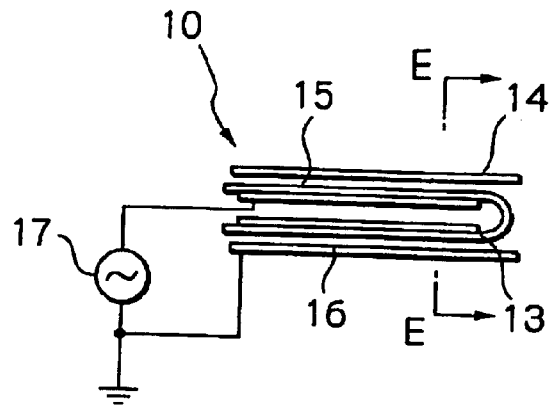
FIG. 9 is a general side view of an electric discharge cell of a conventional ozone generator.
Figure 10:
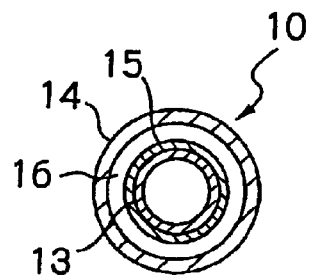
FIG. 10 is across-sectional view of the electric discharge cell, taken along the line E—E in FIG. 9.
Figure 11:
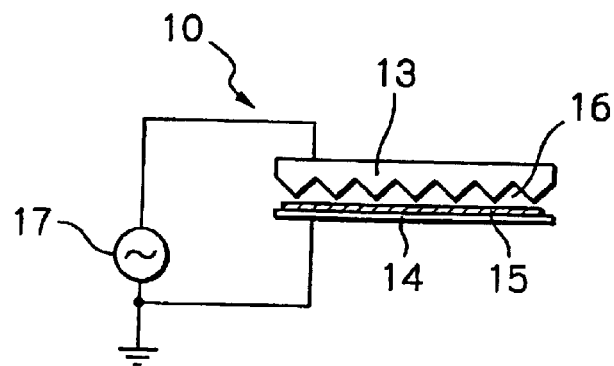
FIG. 11 is a general side view of a conventional electric discharge cell including a number of parallel grooves.

FIG. 8 is a graph illustrating the performance of the ozone generator of the present invention. The abscissa shows the gas flow rate (l/min) and the ordinate shows the concentration ($g/Nm^3$) of ozone. $Nm^3$ represents 1 $m^3$ of gas at 0° C. under 1 atm. Experiments on performance, the results of which are illustrated in FIG. 8, were conducted under the following conditions:

Pressure applied to a discharging gap: 0.20 MPa (gauge pressure)
Temperature of a cooling liquid: 20° C.
Components of a material gas:
  high-purity oxygen 99.2%
  high-purity nitrogen 0.8%
Gap between an electrode and a dielectric plate: 0.1 mm As is apparent from FIG. 8, in the ozone generator of the present invention, a gas containing an extremely high concentration of ozone [345 $g/(Nm^3$ (16.1%)] could be obtained without using an apparatus having a complicated structure, such as an ozone concentrator or a chiller.

In the electric discharge cell of the present invention, at least one of the opposing electrode surfaces forming a space for discharge includes a number of trench grooves extending substantially parallel to each other. A material gas containing oxygen flows through the space for discharge in a direction transverse to the trench grooves, to thereby convert the oxygen in the material gas to ozone. The material gas appropriately passes ridge portions of the trench grooves where a high density of discharge can be obtained, so that a gas containing a high concentration of ozone can be generated. In the electric discharge cell of the present invention, the dielectric plate provided between the opposing electrode surfaces forming the space for discharge is made of sapphire. Therefore, it is possible to obtain a high-purity ozone gas usable in semiconductor manufacturing processes.

In the electric discharge cell of the present invention, in order to cool the pair of electrodes, the same cooling medium can be circulated through the respective cooling medium flow passages for the pair of electrodes. Further, the cooling medium flow passage for cooling the high-voltage electrode is provided at the high-voltage electrode through an insulating plate. By this arrangement, it is possible to use ordinary service water as a cooling medium. Therefore, the cooling medium is abundant and cheap.

The ozone generator of the present invention comprises a plurality of electric discharge cells arranged in a stacked configuration, each comprising disk-shaped electrodes. The electrodes have circular electrode surfaces and are provided with an inlet and an outlet for a material gas and inlets and outlets for a cooling medium arranged at outer circumferential surfaces thereof. The ozone generator of the present invention is compact and space-saving, is capable of generating a gas containing a high concentration of ozone, and has great utility in a variety of applications.

What is claimed is:

1. An ozone generator comprising:
   a pair of electrodes spaced apart in an opposing relationship so as to form a gas flow space therebetween, at least one of said electrodes having a plurality of parallel grooves formed on a surface thereof facing said gas flow space;
   electrically conductive members for connecting said electrodes to a power source to apply a voltage between said electrodes and thereby generate an electric discharge between said electrodes;
   a dielectric arranged between said electrodes; and
   a gas flow passage including an inlet port for supplying a material gas into said gas flow space, and including an outlet port for discharging the material gas from said gas flow space, said gas flow passage being arranged so that the material gas flows through said gas flow space in a direction transverse to a longitudinal direction of said parallel grooves.

2. The ozone generator of claim 1, wherein a first one of said electrodes has said parallel grooves formed on a surface thereof, a second one of said electrodes having a flat surface facing said gas flow space, said dielectric being arranged so as to cover said flat surface of said second one of said electrodes.

3. The ozone generator of claim 1, wherein each of said electrodes comprises a disk-shaped electrode, said gas flow passage including an annular passage at an outer periphery of said electrodes, a central passage at a center position of said electrodes, and a radial guide passage extending in a radial direction with respect to said electrodes and communicating with said central passage, said gas flow space comprising a disk-shaped space communicating with said annular passage and said central passage.

4. The ozone generator of claim 1, further comprising a holding plate supporting an insulating plate and supporting a first one of said electrodes on said insulating plate, said holding plate and a second one of said electrodes each having a cooling medium passage formed therein for allowing an electrically conductive cooling medium to flow through at least one of said cooling medium passage of said holding plate and said cooling medium passage of said second one of said electrodes.

5. The ozone generator of claim 1, further comprising a plurality of pairs of electrodes arranged in a stack, each of said pairs of electrodes being spaced apart in an opposing relationship so as to form a gas flow space therebetween, at least one of each of said pairs of electrodes having a plurality of parallel grooves formed on a surface thereof facing said gas flow space.

6. The ozone generator of claim 1, wherein said dielectric comprises a sapphire.

7. An electric discharge cell for an ozone generator, comprising:
   a pair of electrodes spaced apart in an opposing relationship so as to form a gas flow space therebetween, a first one of said electrodes having a plurality of concentric circular grooves formed on a disk-shaped surface thereof facing said gas flow space, and a second one of said electrodes having a flat dielectric plate arranged on and covering a disk-shaped surface thereof facing said gas flow space;
   electrically conductive members for connecting said electrodes to a power source; and
   a gas flow passage including an inlet port for supplying a material gas into said gas flow space, and including an outlet port for discharging the material gas from said gas flow space, said gas flow passage being arranged so that the material gas flows through said gas flow space in a radial direction transverse to said concentric circular grooves.

8. The electric discharge cell of claim 7, wherein said dielectric comprises a sapphire.

9. The electric discharge cell of claim 7, wherein said inlet port of said gas flow passage is located at an outer periphery of said electrodes so that the material gas flows through said gas flow space in a radially-inward direction from the outer periphery of said electrodes to a center of said electrodes.

10. The electric discharge cell of claim 7, further comprising a holding plate supporting an insulating plate and supporting a supported one of said first one of said electrodes and said second one of said electrodes on said insulating plate, said holding plate and a non-supported one of said first one of said electrodes and said second one of said electrodes each having a cooling medium passage formed therein for allowing an electrically conductive cooling medium to flow through at least one of said cooling medium passage of said holding plate and said cooling medium passage of said non-supported one of said electrodes.

11. An ozone generator comprising a plurality of electric discharge cells of claim 10 arranged in a stack, said cooling medium passage of said holding plate of each of said electric discharge cells having an inlet port at an outer periphery of said holding plate and having an outlet port at said outer periphery of said holding plate, said cooling medium passage of said non-supported one of said electrodes of each of said electric discharge cells having an inlet port at an outer periphery of said non-supported one of said electrodes and having an outlet port at said outer periphery of said non-supported one of said electrodes, said outlet port of said cooling medium passage of said holding plate communicating with said inlet port of said cooling medium passage of said non-supported one of said electrodes in each of said electric discharge cells, the electrically conductive cooling medium comprising water.

* * * * *